(No Model.)
J. W. NELSON.
WHEEL PLOW.
No. 257,371. Patented May 2, 1882.
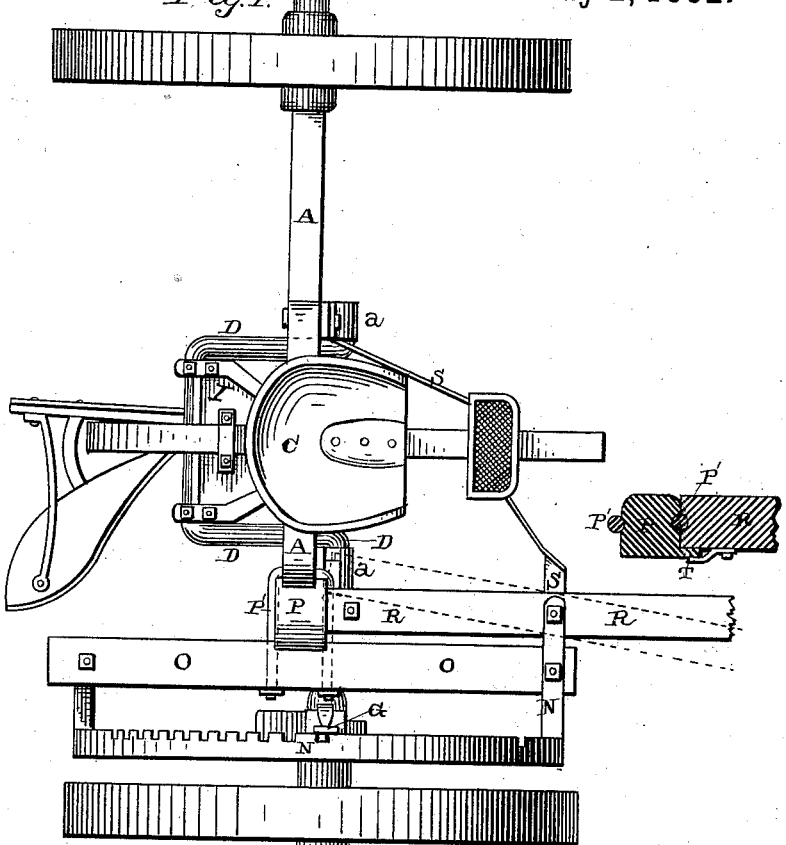
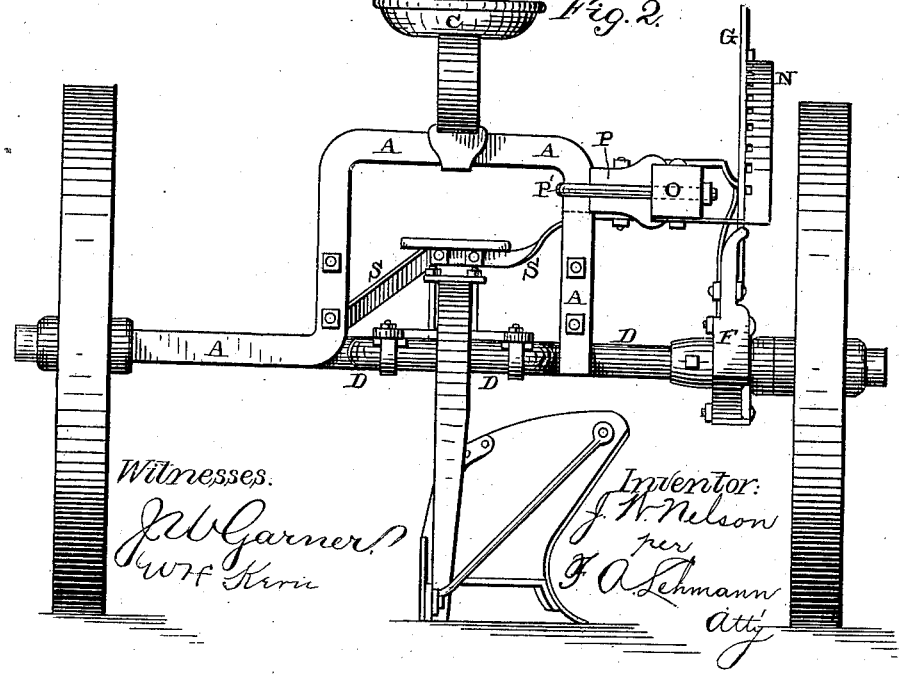
Witnesses.
J. W. Garner
W. H. Kirn
Inventor:
J. W. Nelson
per
F. A. Lehmann
Att'y (No Model.) 2 Sheets—Sheet 2.
J. W. NELSON.
WHEEL PLOW.
No. 257,371. Patented May 2, 1882.
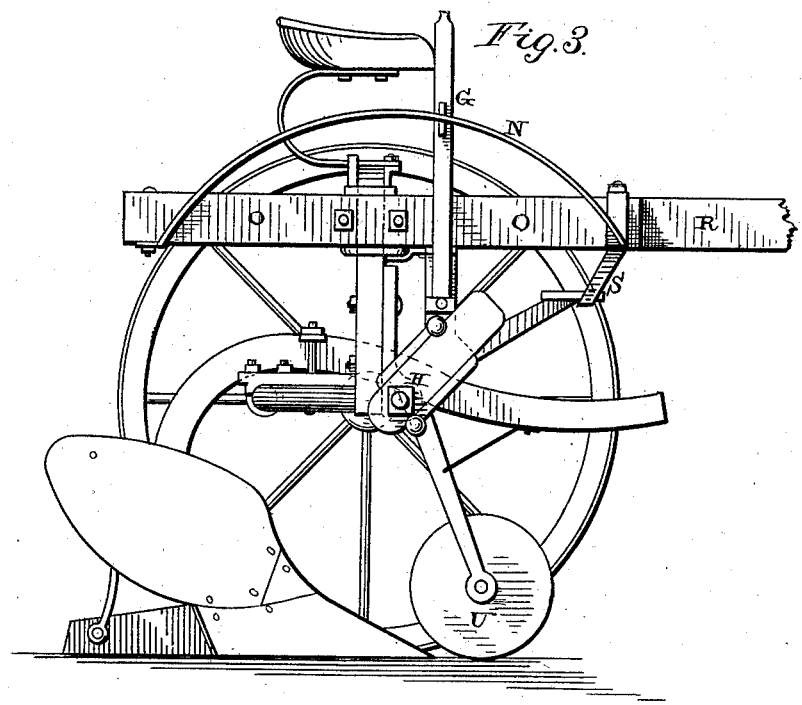
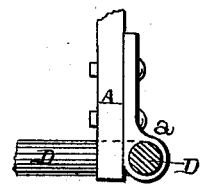
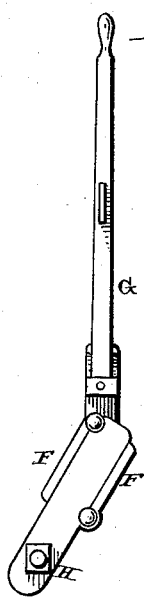
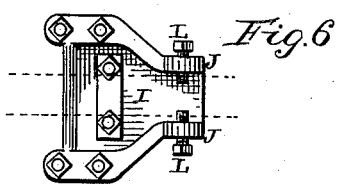
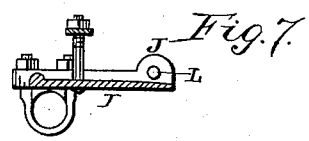
Witnesses:
Inventor:
Jno. W. Nelson
per
F. A. Lehmann,
Atty.

UNITED STATES PATENT OFFICE.

JOHN W. NELSON, OF HUTCHINSON, KANSAS.

WHEEL-PLOW.

SPECIFICATION forming part of Letters Patent No. 257,371, dated May 2, 1882.

Application filed January 27, 1882. (No model.)

*To all whom it may concern:*

Be it known that I, JOHN W. NELSON, of Hutchinson, in the county of Reno and State of Kansas, have invented certain new and useful Improvements in Wheel-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in wheel-plows; and it consists in making the axle out of two separate and independent parts, one of which has the adjustable wheel secured to it, while the other forms a support for the driver's seat and the tongue.

It further consists in attaching to one end of one part of the axle a rod or bar, which forms a support for the ratchet-frame, and to which the tongue is pivoted in any suitable manner, as will be more fully described hereinafter.

The object of my invention is to construct a wheel-cultivator in which the plow can be lowered into and raised above the ground with a single lever, and which will admit of the wheel which is to run in the furrow being raised and lowered at the will of the operator.

Figure 1 is a plan view of my invention. Fig. 2 is a rear view of the same. Fig. 3 is a side elevation taken from the side to which the operating-lever is attached. Figs. 4, 5, 6, and 7 are detail views.

A represents that part of the axle to which the stationary wheel and the seat C are secured. This axle extends horizontally outward at one end to receive the wheel, and then is made U-shaped at its inner end in the usual manner. To the front side of this part A of the axle are secured suitable boxes, *a*, in which the cranked part of the axle D is journaled. This cranked part of the axle has its outer end to extend horizontally outward on a level with the outer end of the part A, and upon the outer end of the cranked part is secured a suitable grooved casting, F, to which the operating-lever G is rigidly secured. By moving this operating-lever the cranked portion of the axle can be turned so as to raise and lower the plow, which is clamped to it in the usual manner. In the outer side of the grooved casting F is secured the spindle H, which has a long shank or slide which extends at right angles to the spindle, and which is clamped to the casting by means of suitable clamping-bolts, so as to hold the slides in any desired position. By moving this slide back and forth the wheel can be adjusted so as to run in the furrows, or so as to have the spindle upon which it turns in a direct line with the spindle upon the other portion of the axle. This slide may be held in position either by clamping devices which catch over its top and hold it in place by frictional contact, as here shown, or in any other way which may be preferred.

The plow is secured to the crank portion of the axle by means of the plate I, which is secured to the axle by means of a clip at each end. Passing up through this plate are two clamping-bolts, which are connected by a plate at their upper ends, and which serve to bind the plow rigidly to the top plate. Formed upon the opposite top edges of this plate are flanges J, and through these flanges are passed the set-screws L, which catch against the opposite sides of the beam and assist in securing it rigidly to the plate. These screws also serve to regulate the angle at which the plow shall stand to the furrow, and thus regulate the width of the furrow cut. By moving the handle G back and forth along the ratchet-bar N, which is secured to the beam O, the crank part of the axle is raised and lowered, so as to elevate and depress the plow.

The beam O is clamped against the casting P, which is grooved at its inner end, so as to catch over the sides of the part A of the axle, and grooved at right angles at its other end, so as to catch over the beam O. The clamp P' passes around the axle A, the casting, and through the beam, so as to secure the parts rigidly in position. The front part of the ratchet-bar is turned inward and fastened upon the top of the beam, while a bolt is passed down through its inner end, which extends over the top of the tongue R.

Fastened to the front side of the part A of the axle is the bar S, upon which the foot-rest is secured, and this bar extends under the tongue and the beam. The bolt which passes down through the beam passes through the bar S, and the bolt forms a pivot upon which the tongue turns. The inner end of the tongue R has its end grooved where it passes over the clamping device which secures the beam to the axle, and secured to the under side of the beam is a suitable guide and clamping device, which catches over the flange T, formed upon the lower edge of the casting P, by means of which the tongue can be secured in any desired position.

By pivoting the tongue, as above shown and described, it can be turned at any desired angle to the furrow, so as to cause the plow to take more or less land.

Secured to the beam at any suitable distance in advance of or over the plow-point is the revolving colter U.

Having thus described my invention, I claim—

1. The combination of the axle A, arched at its inner end, the casting P, secured to one side of the arch and clamped against the inner side of the beam O, the rack-bar N, having its front end bent over the top of the tongue, so as to form a bearing or pivot for it, and the bar S, the rear end of the tongue being made to bear against the casting, substantially as shown.

2. The combination of the casting P, provided with the flange T, the clamping device P′, the tongue R, having a fastening device to catch under the flange, and suitable bearings for the tongue, substantially as described.

3. The combination, in a wheel-plow, of the part A of the axle, the grooved casting P, secured thereto, a suitable clamping device, P′, and the beam O, to which the ratchet-bar and the tongue are secured, substantially as set forth.

4. The combination of the arched axle A, the crank-axle D, the grooved casting F, the spindle H, having an adjustable shank adapted to slide in the grooved casting, and the rigid lever G, substantially as specified.

In testimony whereof I affix my signature in presence of two witnesses.

JOHN W. NELSON.

Witnesses:
FRED RYDE,
CHRIST. T. BECK.